(12) United States Patent
Lee et al.

(10) Patent No.: US 9,429,652 B2
(45) Date of Patent: Aug. 30, 2016

(54) APPARATUS FOR MEASURING DISTANCE

(75) Inventors: Gyeongeon Lee, Bucheon-si (KR); Sungjin Cho, Seoul (KR); Sunghoon Cha, Seoul (KR); Hyunjoon Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 14/345,175

(22) PCT Filed: Oct. 21, 2011

(86) PCT No.: PCT/KR2011/007868
§ 371 (c)(1),
(2), (4) Date: Mar. 14, 2014

(87) PCT Pub. No.: WO2013/058422
PCT Pub. Date: Apr. 25, 2013

(65) Prior Publication Data
US 2014/0340668 A1 Nov. 20, 2014

(51) Int. Cl.
*G01C 3/08* (2006.01)
*G01S 17/48* (2006.01)
*G01S 7/481* (2006.01)

(52) U.S. Cl.
CPC ............... *G01S 17/48* (2013.01); *G01C 3/08* (2013.01); *G01S 7/4817* (2013.01)

(58) Field of Classification Search
CPC ........................................................ G01C 3/08
See application file for complete search history.

(56) References Cited

U.S. PATENT DOCUMENTS

2002/0089722 A1* 7/2002 Perkins et al. ............... 359/155
2003/0005638 A1* 1/2003 Son .................................. 49/340
2004/0114139 A1* 6/2004 Florek et al. ................. 356/328
2007/0270017 A1* 11/2007 Hardacker et al. ........... 439/357
2009/0101297 A1* 4/2009 Jez et al. ....................... 162/198
2009/0296071 A1* 12/2009 Fukumoto ................... 356/5.01
2011/0149300 A1* 6/2011 Takeda .................... F01K 13/02
356/614
2011/0310360 A1* 12/2011 Hsieh .............................. 353/70

FOREIGN PATENT DOCUMENTS

JP H 07-021409 B2 3/1995
KR 10-2007-0035333 A 3/2007
KR 10-2009-0129797 A 12/2009

OTHER PUBLICATIONS

International Search Report dated May 16, 2012 issued in Application No. PCT/KR2011/007868.

\* cited by examiner

*Primary Examiner* — Luke Ratcliffe
*Assistant Examiner* — Samantha K Abraham
(74) *Attorney, Agent, or Firm* — KED & Associates LLP

(57) ABSTRACT

The present invention relates to an apparatus for measuring a distance, the apparatus including a light transmitter including a light source configured to emit a light, and a collimator lens configured to emit a light by converting the light emitted from the light source to a collimation light, and a light receiver including a first mirror configured to reflect the collimation light emitted from the collimator lens to an object, a lens configured to concentrate a light reflected or dispersed from the object to a spot, and a photo-detector configured to form a spot concentrated with light on the lens, wherein an optical axis of the light source matches a rotation shaft of the photo-detector, the light transmitter is fixed and the light receiver rotates about the optical axis of the light source.

13 Claims, 9 Drawing Sheets

FIG. 12
(a)
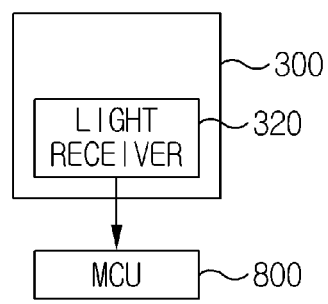
(b)
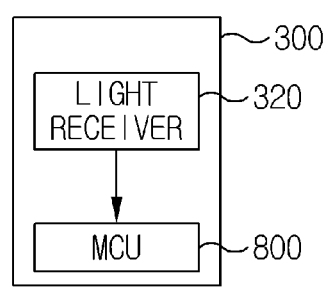

APPARATUS FOR MEASURING DISTANCE

CROSS-REFERENCE TO RELATED PATENT APPLICATIONS

This application is a U.S. National Stage Application under 35 U.S.C. §371 of PCT Application No. PCT/KR2011/007868, filed Oct. 21, 2011.

TECHNICAL FIELD

The present invention relates to an apparatus for measuring a distance.

BACKGROUND INVENTION

Generally, a distance may be obtained using a triangulation method. That is, a distance may be measured if a length of a side and a length of a side are known.

Based on this principle, a distance to an object may be obtained using a position of a light irradiated on an object, reflected from the object, dispersed from the object and formed on a light receiver and an angle of the emitted light. At this time, a position formed on a spot of the light receiver is changed when the distance to the object is changed, and a signal therefrom is detected to calculate a distance.

In general, a distance measuring apparatus that measures a distance to an object using light, such as laser light, performs the measurement using the time-of-flight (TOF) technique and a position sensitive device (PSD) utilizing the difference in angle of light that is reflected off a local object and a remote object.

The time-of-flight (TOF) method is used to measure a distance by detecting the difference between the time at which a light source emits reference light and a time at which an optical sensor detects the reflected light of the reference light, rebounded from a measured object.

As discussed above, many devices and methods measuring a distance to an object using a light are available, and multi-angled technical developments are being waged to better the devices and methods for measuring a distance to an object.

DETAILED DESCRIPTION OF THE INVENTION

Technical Problem

It is an object of the present invention to reduce an inertial moment of a rotor, to reduce a load of a rotation power and to simplify parts of apparatus by realizing a structure of fixing a light transmitter and rotating a light receiver.

Technical Subject

In one general object of the present invention is to provide an apparatus for measuring a distance, the apparatus comprising:

a light transmitter including a light source configured to emit a light, and a collimator lens configured to emit a light by converting the light emitted from the light source to a collimation light; and a light receiver including a first mirror configured to reflect the collimation light emitted from the collimator lens to an object, a lens configured to concentrate a light reflected or dispersed from the object to a spot, and a photo-detector configured to form a spot concentrated with light on the lens, wherein an optical axis of the light source matches a rotation shaft of the photo-detector, the light transmitter is fixed and the light receiver rotates about the optical axis of the light source.

Preferably, but not necessarily, the light source may be a laser diode or a light emitting diode.

Preferably, but not necessarily, the photo-detector may be an image sensor arranged in an 'n×m' matrix, and formed with a plurality of unit pixels configured to convert an optical signal to an electric signal.

Preferably, but not necessarily, the spot may be formed on unit pixels of a line of the image sensor.

Preferably, but not necessarily, the light receiver may include a second mirror configured to reflect the light from the object or to reflect the dispersed light, and the lens concentrates the light reflected from the second mirror to a spot.

Preferably, but not necessarily, the lens may be interposed between the second mirror and the photo-detector.

Preferably, but not necessarily, the first mirror may be configured to tilt.

Preferably, but not necessarily, the photo-detector may be an image sensor including a plurality of unit pixels arranged in an 'n×m' matrix to convert an optical signal to an electric signal.

Preferably, but not necessarily, the spot may be configured to be formed on the unit pixels of a plurality of lines of the image sensor.

Preferably, but not necessarily, the apparatus may further comprise an MCU (Micro Control Unit) configured to process a signal relative to a distance to an object measured by the photo-detector and to determine an object distance data or presence/absence of an object.

Preferably, but not necessarily, the MCU may be embedded in a case of the light receiver.

Preferably, but not necessarily, the apparatus may further comprise a housing embedding the light transmitter and the light receiver.

Preferably, but not necessarily, the case of the light receiver may be formed with a first power transmission structure and a rotary unit configured to rotate a second power transmission structure meshed with the first power transmission structure.

Advantageous Effects

The present invention has an advantageous effect in that elements can be simplified in a distance measuring apparatus using a structure configured to fix a light transmitter emitting a light to an object and to rotate a light receiver reflecting or dispersing a light from the object.

Another advantageous effect is that the light transmitter is structurally fixed and the light receiver is structurally rotated, instead of the light transmitter and the light receiver being integrated, whereby the light transmitter is excluded from the light receiver to reduce a mass of a rotor, to reduce an inertial moment and to reduce a load of a rotation power.

Still another advantageous effect is that an electrical wiring of a rotor can be simplified to increase freedom of electrical wiring in comparison with a structure where only a rotor is available on a light receiver, and a light transmitter and the light receiver are simultaneously rotated.

Further advantageous effect is that a distance to an object can be measured by a triangulation method to detect the presence/absence of a surrounding object of more than a predetermined angle.

Still further advantageous effect is that a detection scope of a distance to an object can be increased by irradiating a light reflected from a tilted mirror to a variety of regions on the object and by detecting the light using a photo-detector.

BRIEF DESCRIPTION OF DRAWINGS

FIGS. 12a and 12b are schematic views illustrating an MCU (Micro Control Unit) connected to a light receiver of an apparatus for measuring a distance according to the present invention.

BEST MODES

Now, the present invention will be described in detail with reference to the accompanying drawings.

In describing the present invention, dimensions such as sizes or thicknesses may be exaggerated, omitted, or schematically shown for clarity of illustration. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The present invention is configured such that elements can be simplified in a distance measuring apparatus using a structure configured to fix a light transmitter emitting a light to an object and to rotate a light receiver reflecting or dispersing a light from the object.

Figure 1:
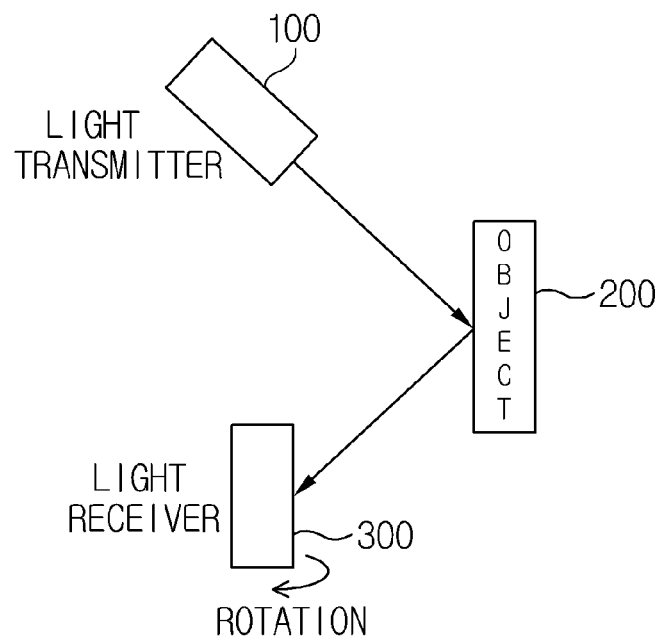
FIG. 1 is a mimetic diagram illustrating an apparatus for measuring a distance according to the present invention.

FIG. 1 is a mimetic diagram illustrating an apparatus for measuring a distance according to the present invention.

The apparatus for measuring a distance (hereinafter referred to as "a distance measuring apparatus", or simply "apparatus") includes a fixed light transmitter (100) configured to emit a light, and a rotating light receiver (300) including a photo-detector forming a spot of light reflected or dispersed from an object (200).

Therefore, the apparatus according to the present invention can measure a distance to an object by detecting whether there is a surrounding object having more than a predetermined angle using a triangulation method.

Furthermore, the apparatus according to the present invention is configured such that the light transmitter is structurally fixed and the light receiver is structurally rotated, instead of the light transmitter and the light receiver being integrated, whereby the light transmitter is excluded from the light receiver to reduce a mass of a rotor, to reduce an inertial moment and to reduce a load of a rotation power.

Still furthermore, the apparatus according to the present invention is configured such that an electrical wiring of a rotor can be simplified to increase freedom of electrical wiring in comparison with a structure where only a rotor is available on a light receiver, and a light transmitter and the light receiver are simultaneously rotated.

The apparatus can continuously emit a light using a fixed light transmitter configured to detect the presence/absence of a surrounding object and a distance to the object, where, when an object (200) is existent at a surrounding area of the apparatus, the light emitted from the light transmitter (100) is reflected or dispersed from the object (200). The light reflected or dispersed from the object (200) can be formed on a spot of the photo-detector of the light receiver (300) to detect presence/absence of object and a distance to the object.

Figure 2:
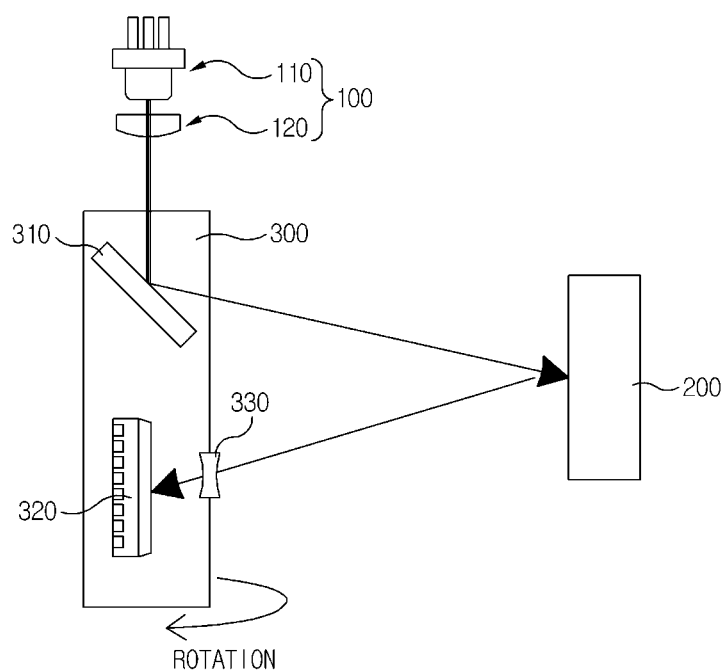
FIG. 2 is a mimetic diagram illustrating an apparatus for measuring a distance according to a first exemplary embodiment of the present invention.

FIG. 2 is a mimetic diagram illustrating an apparatus for measuring a distance according to a first exemplary embodiment of the present invention.

The light transmitter (100) of the apparatus according to a first exemplary embodiment of the present invention includes a light source (110) configured to emit a light, and a collimator lens (120) configured to emit a light by converting the light emitted from the light source (110) to a collimation light. Furthermore, the light receiver (300) includes a first mirror (310) configured to reflect the collimation light emitted from the collimator lens (120) to an object, a lens (330) configured to concentrate a light reflected or dispersed from the object (200) to a spot, and a photo-detector (320) configured to form a spot concentrated with light on the lens (330), wherein the light transmitter (100) is fixed while the light receiver (300) rotates about an optical axis of the light source.

The light emitted from the light source (110) is converted and emitted by the collimator lens (120) to a collimation light, where the collimation light is reflected by a first mirror (310) of the rotating light receiver (300). The light reflected by the first mirror (310) is reflected or dispersed by the object (200) to be incident on the lens (330), when there is present an object (200).

Furthermore, the lens (330), which is a concentration lens, is interposed between the object (200) and the photo-detector (320) to concentrate the light reflected or dispersed by the object (200) on a spot and to allow the spot to be formed on an incident surface of the photo-detector (320).

The light source (110) may include a laser diode or a light emitting diode. The photo-detector (320) may include an image sensor. In addition, an optical axis of the light source may be formed in the same way as the rotation shaft of the light receiver (300) as illustrated in FIG. 2.

Thus, the apparatus according to the present invention can measure a distance to an object and presence/absence of the object within a variety of scopes such as 180° and 360° in response to rotation radius of the light receiver, because the light receiver can rotate to receive a light reflected from the object.

Meantime, the lens (330) in the present invention is not limited to the shape in the drawings but may be realized by at least one lenses that can perform an optical function capable of reflecting or dispersing a light from the object (200) to a spot.

Figure 3:
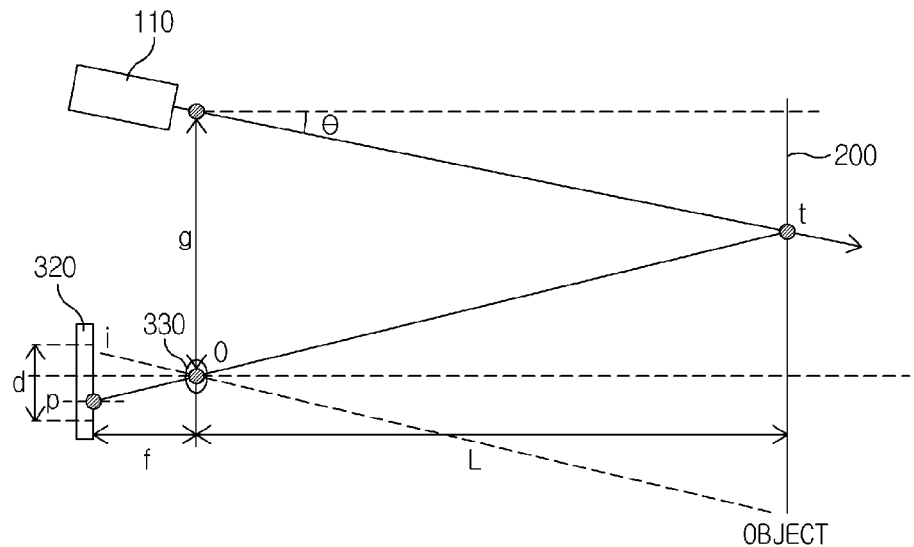
FIG. 3 is a schematic view illustrating a basic principle of triangulation method used to an apparatus for measuring a distance according to the present invention.

FIG. 3 is a schematic view illustrating a basic principle of triangulation method used to an apparatus for measuring a distance according to the present invention.

The light source (110) is slantly arranged relative to the object (200). The photo-detector (320) is spaced apart from the light source and the lens (330) is interposed between the photo-detector (320) and the object. At this time, a distance between the object (200) and the lens (330) is defined as 'L' and the distance (L) may be calculated by the following Equation 1.

$$L = \frac{-fg}{p - f\tan\Theta} \quad \text{[Equation 1]}$$

where f is a focal length, g is a gap between a light source and a lens, $\Theta$ is an slant angle of the light source and p is a position of spot of light reflected or dispersed from an object that is formed on a photo-detector.

Figure 4:
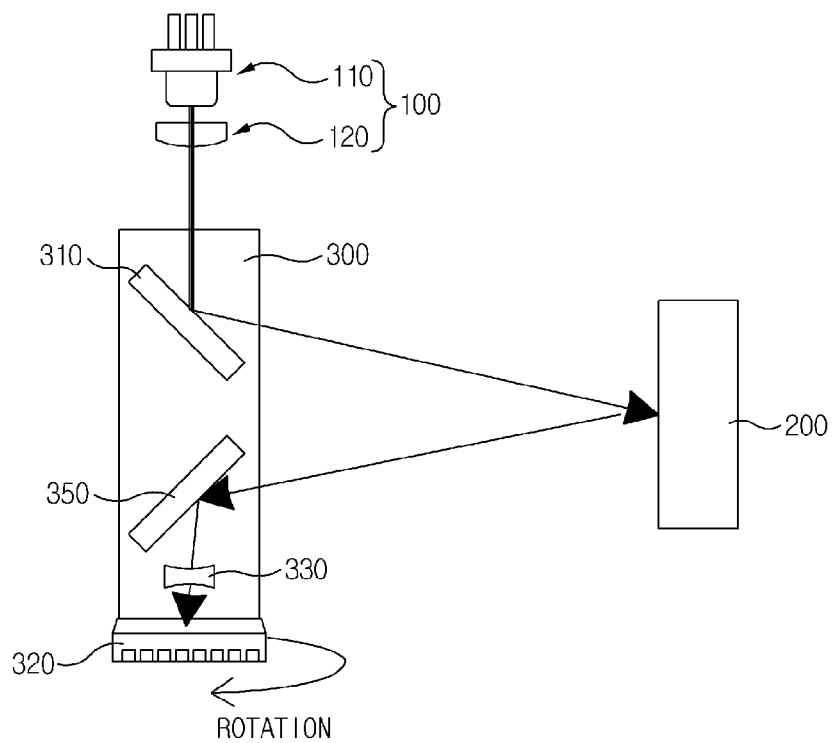
FIG. 4 is a mimetic diagram illustrating an apparatus for measuring a distance according to a second exemplary embodiment of the present invention.
Figure 5:
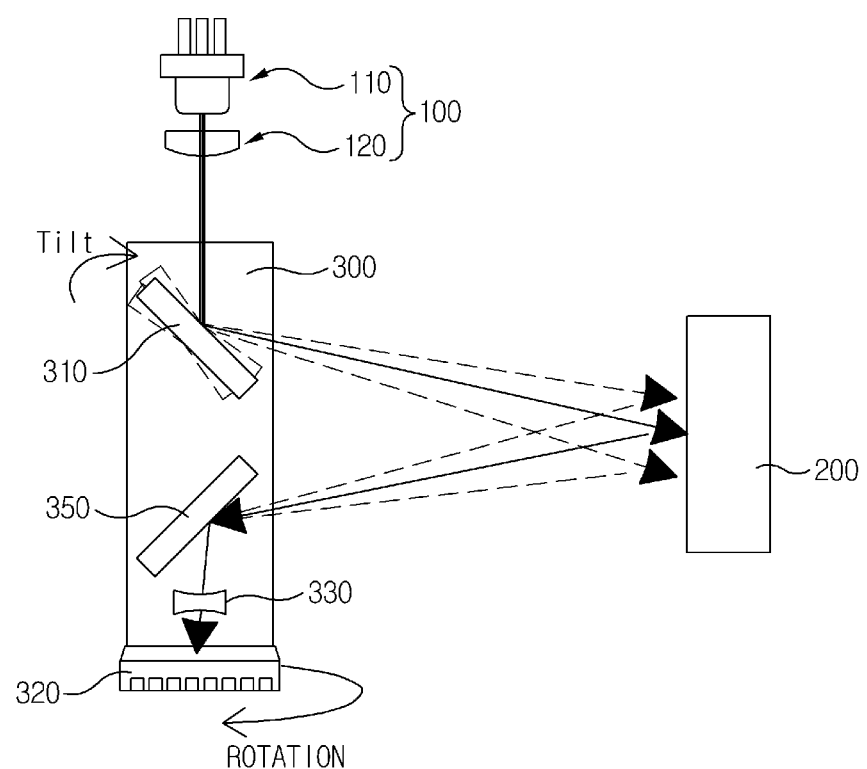
FIG. 5 is a mimetic diagram illustrating an apparatus for measuring a distance according to a third exemplary embodiment of the present invention.
Figure 6:
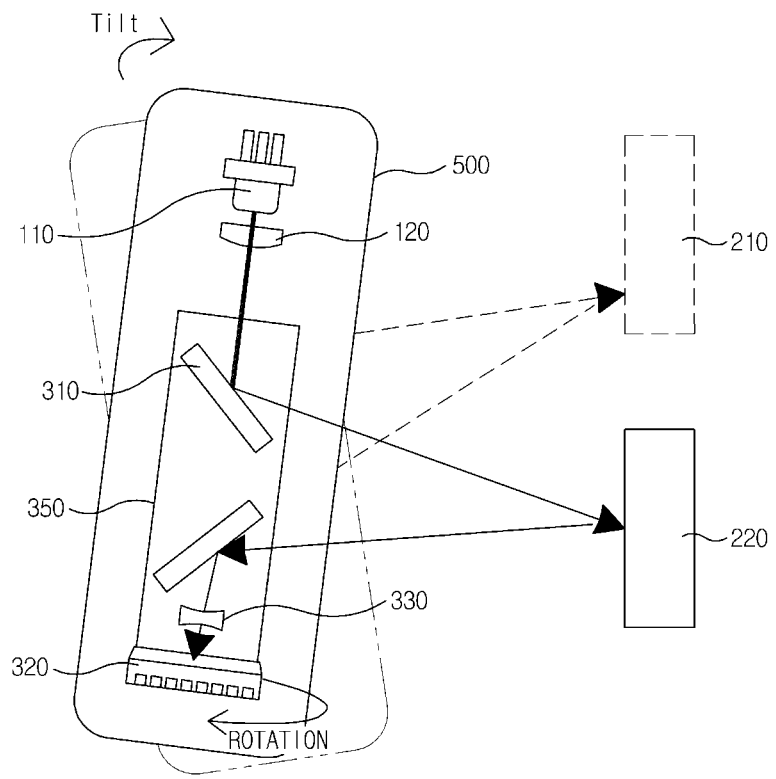
FIG. 6 is a mimetic diagram illustrating an apparatus for measuring a distance according to a fourth exemplary embodiment of the present invention.

FIG. 4 is a mimetic diagram illustrating an apparatus for measuring a distance according to a second exemplary embodiment of the present invention, FIG. 5 is a mimetic diagram illustrating an apparatus for measuring a distance according to a third exemplary embodiment of the present invention, and FIG. 6 is a mimetic diagram illustrating an apparatus for measuring a distance according to a fourth exemplary embodiment of the present invention.

Referring to FIG. 4, the light receiver (300) according to a second exemplary embodiment of the present invention includes a first mirror (310) configured to reflect a collimation light emitted from a collimation lens (120) to an object (200), a second mirror (350) configured to reflect a light reflected or dispersed from the object (200), a third mirror (330) configured to concentrate a light reflected from the second mirror (350) to a spot, and a photo-detector (320) configured to form a spot concentrated by the lens (330).

Thus, the light reflected or dispersed by the object (200) is incident on the second mirror (350), and the light reflected from the second mirror (350) is concentrated on the lens (330) to form a spot on an incident surface of the photo-detector (320), where the lens (330) is interposed between the second mirror (350) and the photo-detector (320).

Referring to FIG. 5, the apparatus according to the third exemplary embodiment of the present invention is formed with the first mirror (310) that is formed to be tilted as in the second exemplary embodiment of the present invention.

The apparatus according to the third exemplary embodiment of the present invention is configured such that the first mirror (310) is tilted to allow a light reflected from the tilted first mirror (310) to be irradiated on a plurality of regions, which is in turn detected by the photo-detector (320) to increase a detection scope of a distance to the object.

The apparatus according to a fourth exemplary embodiment of the present invention is configured such that a housing (500) is embedded by a light transmitter and a light receiver, and the house (500) is made to tilt. Thus, a detection scope to an object can be further increased by the housing (500) being tilted.

That is, as illustrated in FIG. 6, when the housing (500) is tilted, a distance to objects '210' and '220' that are vertically arranged can be measured, where the housing embedded by a light source (110) which is an element of the light transmitter, a collimator lens (120) and a light receiver (300), and the light receiver (300) can selectively include the elements of the light receiver according to the first to third exemplary embodiments of the present invention. FIG. 6 illustrates a light receiver formed with the first and second mirrors (310,350) and the light transmitter (320) according to the second exemplary embodiment of the present invention.

Figure 7:
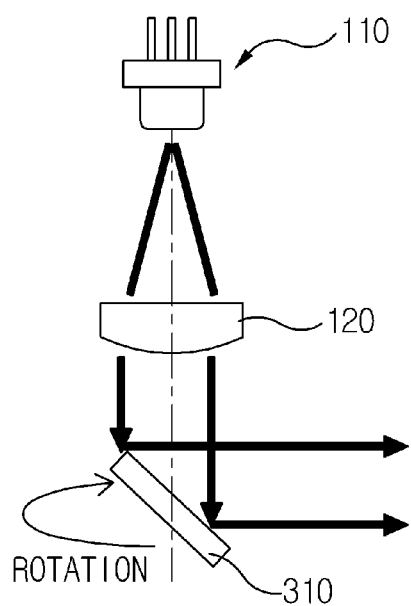
FIG. 7 is a mimetic diagram illustrating an example of a light transmitter used to an apparatus for measuring a distance according to the present invention.
Figure 8:
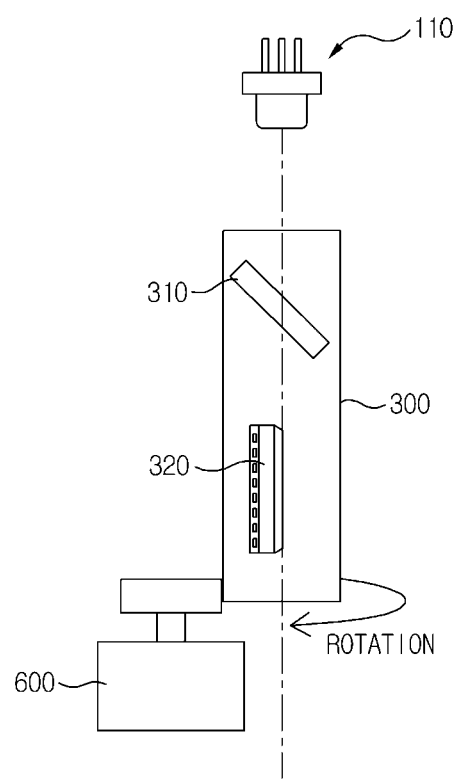
FIG. 8 is a mimetic diagram illustrating an example of a rotor used to an apparatus for measuring a distance according to the present invention.
Figure 9:
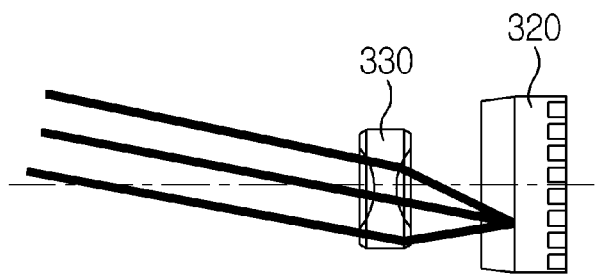
FIG. 9 is a mimetic diagram illustrating an example of a light receiver used to an apparatus for measuring a distance according to the present invention.

FIG. 7 is a mimetic diagram illustrating an example of a light transmitter used to an apparatus for measuring a distance according to the present invention, FIG. 8 is a mimetic diagram illustrating an example of a rotor used to an apparatus for measuring a distance according to the present invention, and FIG. 9 is a mimetic diagram illustrating an example of a light receiver used to an apparatus for measuring a distance according to the present invention.

Referring to FIG. 7, a light transmitter includes a light source (110) configured to emit a light, and a collimator lens (120) configured to convert a light emitted from the light source (110) to a collimation light, and emit the collimation light to a collimator lens (120).

The collimation light emitted from the collimator lens (120) is incident on the first mirror (310) of the light receiver and reflected to the object (200), where the light receiver rotates, and may include a variety of driving means and structures for rotating the light receiver.

For example, as illustrated in FIG. 8, the light receiver can be rotated, when a case of the light receiver is formed with a first power transmission structure including a belt, a gear and a chain, and a rotary unit (600) configured to rotate a second power transmission structure by being meshed with the first power transmission structure.

As an alternative method, a rotation shaft may be rotated to rotate the light receiver when a lower part of the light receiver is fixed to the rotation shaft of a motor and the motor is driven. In addition, the light receiver can concentrate the light reflected or dispersed from the object (200) to allow a spot to be formed on an incident surface of the photo-detector (320) as illustrated in FIG. 9.

Figure 10:
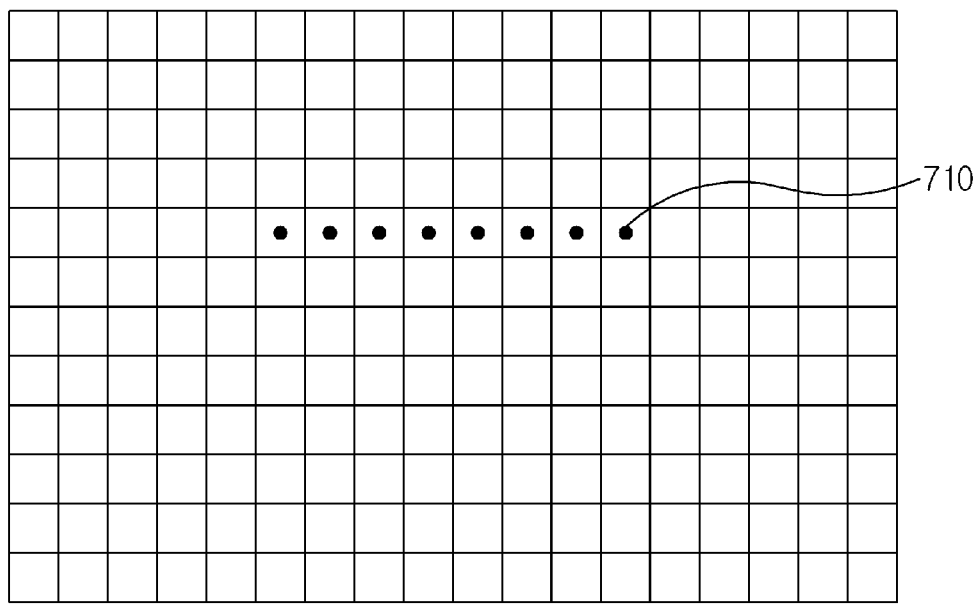
FIG. 10 is a mimetic plan view illustrating a spot formed on a photo-detector of a light receiver of an apparatus for measuring a distance according to first and second exemplary embodiments of the present invention.
Figure 11:
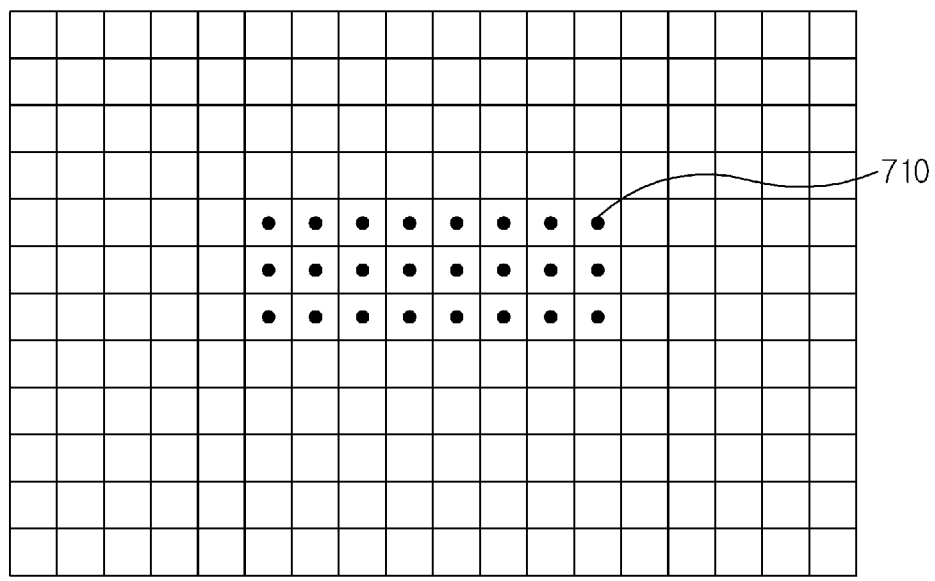
FIG. 11 is a mimetic plan view illustrating a spot formed on a photo-detector of a light receiver of an apparatus for measuring a distance according to a third exemplary embodiment of the present invention.

FIG. 10 is a mimetic plan view illustrating a spot formed on a photo-detector of a light receiver of an apparatus for measuring a distance according to first and second exemplary embodiments of the present invention, and FIG. 11 is a mimetic plan view illustrating a spot formed on a photo-detector of a light receiver of an apparatus for measuring a distance according to a third exemplary embodiment of the present invention.

The photo-detector according to the present invention may include an image sensor including a plurality of unit pixels arranged in an 'n×m' matrix to convert an optical signal to an electric signal.

Thus, the image sensor in the apparatus according to the first and second exemplary embodiments of the present invention can allow an optical spot (710) to be formed on unit pixels of a line. Furthermore, the image sensor in the apparatus according to the third exemplary embodiment of the present invention can allow the optical spot (710) to be formed on unit pixels of a plurality of lines in response to tilting frequency of the first mirror, as illustrated in FIG. 11.

At this time, although FIG. 10 illustrates spots formed on a part of unit pixels of fifth line, the spots may be formed on an entire unit pixel of the fifth line. Although FIG. 11 illustrates spots formed on a part of unit pixels of the fifth to seventh lines, the spots may be formed on an entire unit pixel of fifth to seventh lines. Thus, the third exemplary embodiment of the present invention can broaden a scope of measuring a distance to an object to a vertical direction by tilting a mirror only, instead of tilting an entire element.

FIGS. 12a and 12b are schematic views illustrating an MCU (Micro Control Unit, 800) connected to a light receiver of an apparatus for measuring a distance according to the present invention.

A signal relative to a distance to an object measured by the light receiver (320) of an apparatus according to the present invention may be processed by the MCU (800) to determine a distance data to an object and to determine the presence/absence of the object. At this time, as illustrated in FIG. 12, the MCU (800) may be installed at a device apart from the light receiver (300), or may be embedded inside a case of the light receiver (300), as illustrated in FIG. 12b. For information, the MCU (800) may be mounted on a PCB (Printed Circuit Board).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The apparatus for measuring a distance according to exemplary embodiments of the present invention has an industrial applicability in that a light transmitter is structurally fixed and a light receiver is structurally rotated, instead of the light transmitter and the light receiver being integrated, whereby the light transmitter is excluded from the light receiver to reduce a mass of a rotor, to reduce an inertial moment and to reduce a load of a rotation power.

The invention claimed is:

1. An apparatus for measuring a distance, the apparatus comprising:
   a light transmitter including a light source configured to emit a light, and a collimator lens configured to emit a light by converting the light emitted from the light source to a collimation light; and
   a light receiver including a first mirror configured to reflect the collimation light emitted from the collimator lens to an object, a lens configured to concentrate a light reflected or dispersed from the object to a spot, and a photo-detector on which a spot is formed,
   wherein an optical axis of the light source matches a rotation shaft of the photo-detector, the light transmitter is fixed, and the light receiver rotates about the optical axis of the light source, and
   wherein the first mirror rotates according to rotation of the light receiver.

2. The apparatus of claim 1, wherein the light source is a laser diode, or a light emitting diode.

3. The apparatus of claim 1, wherein the photo-detector is an image sensor arranged in an 'n×m' matrix, and the photo-detector is formed with a plurality of unit pixels configured to convert an optical signal to an electric signal.

4. The apparatus of claim 3, wherein the spot is formed on unit pixels of a line of the image sensor.

5. The apparatus of claim 1, wherein the light receiver includes a second mirror configured to reflect the light from the object or to reflect the dispersed light, and the lens concentrates the light reflected from the second mirror to a spot.

6. The apparatus of claim 5, wherein the lens is interposed between the second mirror and the photo-detector.

7. The apparatus of claim 5, wherein the first mirror is configured to tilt.

8. The apparatus of claim 7, wherein the photo-detector is an image sensor including a plurality of unit pixels arranged in an 'n×m' matrix to convert an optical signal to an electric signal.

9. The apparatus of claim 8, wherein the spot is configured to be formed on the unit pixels of a plurality of lines of the image sensor.

10. The apparatus of claim 5, further comprising an MCU (Micro Control Unit) configured to process a signal relative to a distance to an object measured by the photo-detector and to determine an object distance data or presence/absence of an object.

11. The apparatus of claim 10, wherein the MCU is embedded in a case of the light receiver.

12. The apparatus of claim 1, further comprising a housing embedding the light transmitter and the light receiver.

13. The apparatus of claim 1, further comprising:
   a case in which the light receiver is embedded inside;
   a first power transmission structure connected with the case;
   a second power transmission structure connected with the first power transmission structure; and
   a rotary unit configured to rotate the second power transmission structure.

* * * * *